(12) United States Patent
Guichaoua et al.

(10) Patent No.: US 6,308,836 B1
(45) Date of Patent: Oct. 30, 2001

(54) FILTER AND FILTER CARTRIDGE WITH PERIPHERAL STOP FOR FILTERING LIQUIDS CIRCULATING IN AN ENGINE OR IN A HYDRAULIC EQUIPMENT

(75) Inventors: Jean-Luc Guichaoua, Combrit; Jean-Yves Picard, Quimper; Benoit LeRoux, Fouesnant, all of (FR)

(73) Assignee: Fleetguard, Inc., Columbus, IN (US)

( * ) Notice: Subject to any disclaimer, the term of this patent is extended or adjusted under 35 U.S.C. 154(b) by 0 days.

(21) Appl. No.: 09/403,502

(22) PCT Filed: Apr. 17, 1998

(86) PCT No.: PCT/FR98/00786

§ 371 Date: Feb. 23, 2000

§ 102(e) Date: Feb. 23, 2000

(87) PCT Pub. No.: WO98/47597

PCT Pub. Date: Oct. 29, 1998

(30) Foreign Application Priority Data

Apr. 18, 1997 (FR) .................................................. 97 05041

(51) Int. Cl.$^7$ .................................................. B01D 35/34
(52) U.S. Cl. ........................... 210/440; 210/450; 210/451
(58) Field of Search ..................................... 210/440, 443, 210/445, 450, 451, 452, 454, 455, 493.2; 277/918

(56) References Cited

U.S. PATENT DOCUMENTS 5,702,602 * 12/1997 Brown et al. ........................ 210/450

FOREIGN PATENT DOCUMENTS

| 4105074 | * | 11/1991 | (DE) . | |
|---|---|---|---|---|
| 4428771 | * | 2/1996 | (DE) . | |
| 25647 | * | 4/1923 | (FR) | ...................................... 210/440 |
| 1143840 | * | 10/1957 | (FR) | ...................................... 210/445 |

* cited by examiner

*Primary Examiner*—Matthew O. Savage
(74) *Attorney, Agent, or Firm*—Gary M. Gron

(57) ABSTRACT

The invention concerns a filter for liquid circulating in an engine unit or in hydraulic equipment including a tank (1) cooperating with a closure element (2) with a filtering cartridge (3) inserted in the tank (1) and adjusted therein by threadedly engaging the closure element (2) with the tank (1). The cartridge (3) includes a filtering material (4) having at one of its ends a first flange (5) and at the other of its ends a second flange (6) that includes a peripheral seal (8) designed to be sealingly clamped between an end of the tank and the closure element (2) when the tank (1) is threadedly with the closure element (2). The invention is characterized in that it includes at least one element forming a stop (9, 91) provided on the second flange (6) and/or on the closure element (2) and/or on the tank (1), the element forming a stop (9,91) being designed to control clamping of the peripheral seal (8) with the closure element (2).

9 Claims, 3 Drawing Sheets

FILTER AND FILTER CARTRIDGE WITH PERIPHERAL STOP FOR FILTERING LIQUIDS CIRCULATING IN AN ENGINE OR IN A HYDRAULIC EQUIPMENT

The field of the invention is that of the filtration of a liquid, notably oil, fuel or cooling liquid, circulating in an engine, in particular, in a thermal engine or in a piece of hydraulic equipment.

More precisely, the invention relates to a filter of the type comprising a tank that receives a filter cartridge and which can be closed by a closure element, said filter cartridge being detachable and being able to be replaced after a certain using time. This type of cartridge generally has a tubular shape and defines, within the filter, an upstream filtering compartment and a downstream filtering compartment. There are filters in which the upstream filtering compartment is formed between the internal wall of the tank and the outside of the cartridge while the downstream filtering compartment is constituted by the internal chamber of the cartridge while, conversely, in other types of filters, it is the internal chamber of the cartridge that constitutes the upstream filtering compartment, the downstream filtering compartment being formed between the internal wall of the tank and the external wall of the cartridge.

In certain types of engine, the tank of the filter is integrated with the engine block and closed by a cover which can be removed in order to access the filtering cartridge, while in other types of engine, it is the filter tank which is detachable and which can be screwed onto a "filter head" integrated with the engine block. In this description, one therefore understands the term "closure element" as being either the cover mentioned above or the filter head.

When the cartridge positioned in the tank is worn out, that is to say when the filtering element no longer fulfils its filtration role satisfactorily, according to the case, either the cover is removed or the tank is separated from the filter head, the used cartridge is taken out of the tank and is replaced by a new cartridge and the cover is replaced or the tank is replaced against the filter head.

Subsequently, used cartridges are incinerated in such a way that the polluting organic substances are destroyed and the inorganic polluting materials are concentrated. With the aim of optimizing such an operation, it has been proposed in the state of the technology that they are made from "green" materials which can be incinerated given a minimum of polluting materials. Such "green" cartridges have a mono-layered or multi-layered filtering material (also called a "medium" in the language of men skilled in the art) made up, for example, of paper, cardboard, fabric or woven or non-woven fibers (or of a mixture or a superimposition of such materials, one layer of which can be a support layer), most commonly folded into a star, and two end flanges made of a non-metallic material which preferably are not connected to one another by any rigid link other than the medium, which then facilitates their incineration, the lack of any rigid member then allowing one to reduce notably the proportion of plastic material necessary for the manufacture of such cartridges. In the case where a support material is present, this can be rigid or of chosen flexibility.

The operation of this kind of filter is as follows: the liquid to be filtered (for example oil) is admitted through an inlet orifice, it arrives in the upstream filtering compartment, passes through a filtering element of the cartridge which retains the particles found in suspension in the liquid, then the liquid filtered in this way passes into the downstream filtering compartment and leaves through an outlet orifice.

In a conventional way, the sealing of the tank with the closure element is provided by a gasket which must be positioned by the user. So as to facilitate the placement of the cartridge and to avoid handling such a gasket, it has also been proposed in the state of the technology to integrate such a gasket with the periphery of one of the flanges of the cartridge itself, this flange part being blocked between the cover and the tank during placement.

One of the disadvantages associated with the use of this kind of filter is apparent during the operation of clamping the tank with the closure element.

This clamping can, according to the various types of known filters, be carried out notably by directly screwing the tank with the closure element or by bolting it. In the majority of filters, it is very difficult for the user to obtain good clamping, that is to say clamping that is sufficiently strong to enable one to guarantee the seal provided by the gasket provided between the tank and the closure element but not too strong so that the properties of the gasket under consideration deteriorate or that the closure element or the tank is deformed or damaged.

Hence as a general rule, the user has a tendency either to tighten the tank and the closure element too much which leads to a reduction in the sealing capability of the filter and as a consequence its life, or to not tighten it sufficiently which leads to leaks, the gasket then only partially fulfilling its function.

In the filters that use several bolts to fix the closure element onto the tank, the clamping obtained is generally not well distributed between the various bolts, which increases the risks of leaks or of deterioration of the gasket. This problem is increased because this clamping operation must be carried out using a tool which makes it even more difficult to judge the degree of clamping.

In order to respond to this problem, it has already been proposed in the state of the technology to provide a gasket between the closure element and the tank. Such a solution has however the disadvantage of using a gasket which is not integral with the filter cartridge and also that of implying a contact between the metal of the closure element and the metal of the tank, such a contact possibly leading to seizing. Finally, such a solution necessitates a high clamping torque.

The objective of this invention is to describe a technical solution that allows one to use a seal integrated with a second flange of the filter cartridge and enables one to provide a homogeneous and straightforward clamping of the closure element with the tank, using a moderate tightening torque that can be provided manually.

This objective is achieved by the invention which relates to a filter for a liquid circulating in an engine block or in a piece of hydraulic equipment that includes a tank co-operating with a closure element and a filter cartridge inserted into said tank and locked into it by clamping said closure element with said tank, said cartridge being of the type that includes a filtering material having at one of its ends a first flange and at the other of its ends a second flange the peripheral part of which is designed to be blocked between said tank and said closure element when said tank is clamped with said closure element, characterized in that it includes at least one element forming a stop provided on said second flange and/or said closure element and/or on said tank, said element forming a stop being designed to control said clamping of said tank with said closure element.

Such a stopping element allows the user to know at what moment the ideal clamping of the closure element with the tank has been achieved. It should be noted that such clamping will generally be carried out by screwing, this screwing taking place according to case, by screwing the closure element (cover) onto the tank, when this is integral with the filter head or by screwing the tank onto the filter head which then constitutes the closure element. In the first case, the invention could also be implemented when the cover is bolted onto the tank.

Furthermore, such a stopping element allows one to use a moderate tightening torque that permits effective clamping by hand and produces a clear sensation of clamping. This stopping element therefore enables one to avoid all the problems associated with too tight a clamping or insufficient clamping that are mentioned above.

It could also be envisaged to create the stopping element according to the invention on one of the flanges of the filter cartridge, for example, using one or more elements that project from its surface or forming this stopping element using at least one element that projects from the closure element and/or from the tank (at the edge of its opening).

Hence, according to a first variant, said element forming a stop is provided on said peripheral part of said second flange of said filter cartridge.

According to another variant, said element forming a stop comprises at least one element that projects from said closure element and/or from said tank (at the edge of its opening).

It will be noted that these two variants could be combined, it being possible for one of the elements to project from a flange of the filter cartridge and the other from the closure element or from the tank.

According to a preferred variant of the invention, said peripheral part of said second flange is provided with an integral seal. Such an integral seal can, for example, cover both sides of the edge of the peripheral part of the second flange. Such a type of seal has the advantage of being present on the cartridge and hence of facilitating the positioning and the changing of it, no additional manipulation of the seal being necessary for the user.

Also preferably, said stopping element is circular. One could also envisage creating said stop in other shapes, for example in the shape of several circular arcs.

According to one advantageous embodiment of the invention, when the stopping element is provided on the flange, said peripheral part of this flange comprises at least one first and at least one second projecting element, the first projecting element on the upper face of said peripheral part and the second projecting element on the lower face of said peripheral part.

Preferably the first and the second elements are then essentially provided in the same transverse plane.

According to another preferred variant of the invention, said peripheral seal is provided with at least one ridge, the stop and the ridge being sized in such a way as to control the squeezing of said ridge. Advantageously said ridge has a height which when at rest is greater than the height of said stop. Such a ridge enables one to ensure the tightness provided by the seal under all temperature situations most notably when it is extremely cold.

Advantageously, said second flange includes a peripheral part, a central part fixed to said element of filtering material and a flexible part linking said central part to said peripheral part. Such a configuration allows one to improve the locking of the cartridge at the bottom of the filter, notably with the purpose of preventing hyperstatic situations for the cartridge which can engender a deterioration of the gaskets of the filter, and if the need arises with the purpose of closing off an automatic emptying orifice provided in the bottom of this tank.

Also advantageously, said filtering material is chosen from the group made up of paper, cardboard, fabric, materials made up of woven or non-woven fibers or by a mixture or a superimposition of these products and said second flange and said first flange of said cartridge are only linked to one another through said element of filtering material. Such characteristics are used in cartridges called "green" cartridges and described above which have the advantage of being easily incinerated.

The invention and the various advantages which it offers, will be more easily understood thanks to the description which follows of a non-limitative embodiment of the invention that refers to the drawings in which.

Figure 1:
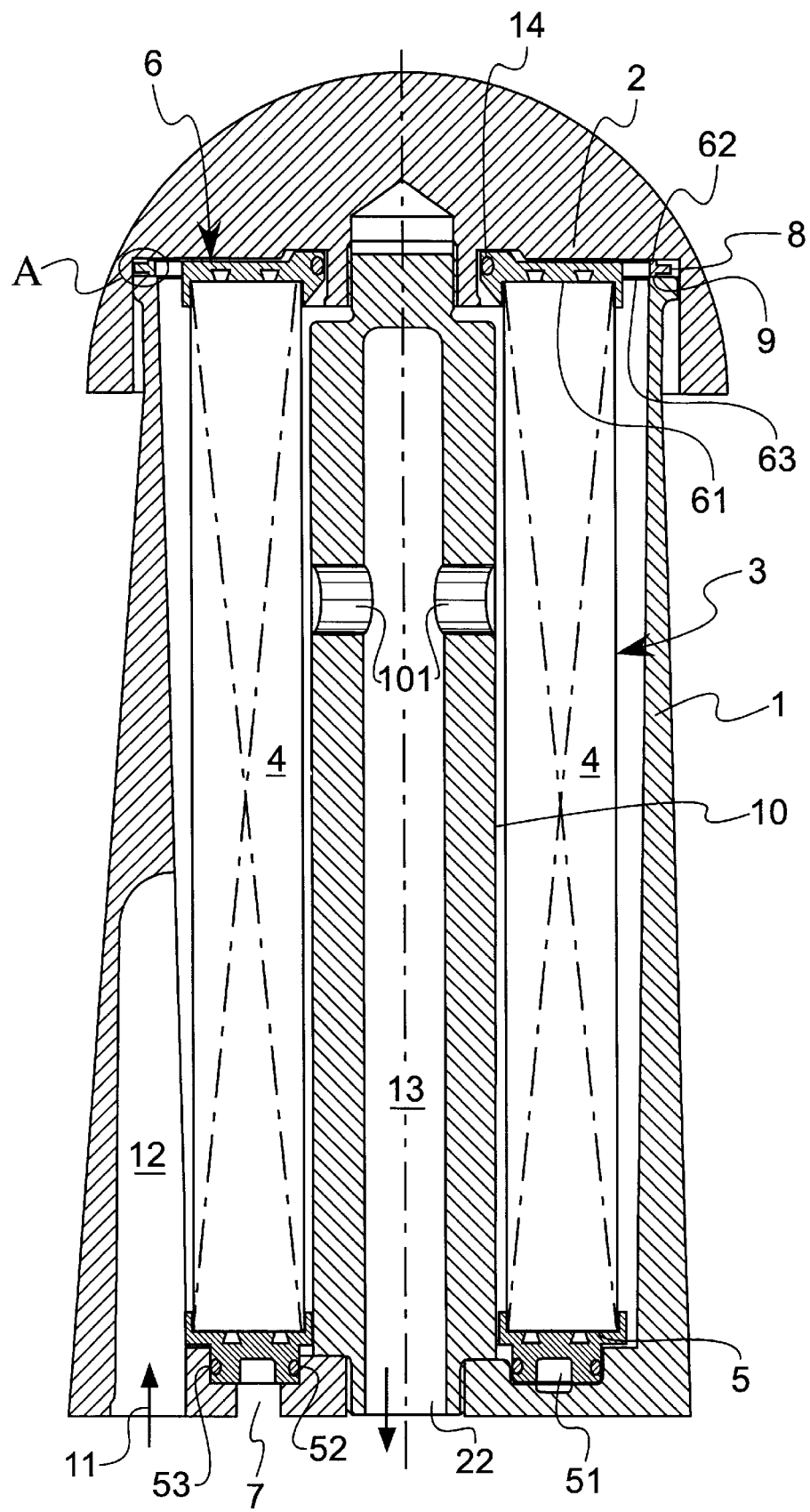
FIG. 1 represents a first embodiment of an oil filter fitted with a filter cartridge according to the invention.

With reference to FIG. 1, the filter shown comprises four main elements, namely:
  a tank 1 intended to be fixed onto a member (not shown) integral with an engine block of a vehicle and provided with an inlet orifice 11 for a liquid to be filtered (in this case an oil), an outlet orifice for a filtered liquid 22 and an emptying orifice 7;
  a closure element forming a cover 2 screwed onto the tank 1 during operation of the filter;
  a tubular filter cartridge 3 including a second flange 6 and a first flange 5 made of plastic material welded to each of the ends of an element of filtering material 4 constituted by paper folded into a star; and
  a central hollow core 10 provided with openings 101 that communicate with its internal chamber, said central core being screwed through its upper end into the cover 2 in such way as to extend along the longitudinal axis of the filter, said cartridge being positioned around this central core and locked by it.

During operation of the filter, the liquid to be filtered is introduced under pressure into it through the inlet orifice 11, passes through the upstream filtering compartment 12 defined by the internal wall of the tank 1 and the external wall of the cartridge 3, is filtered by forced passage within the filtering material 4 and finds itself in the downstream filtering compartment 13 defined by the longitudinal port of the central core 10, passing through the openings 101, before being discharged through the orifice 22.

Figure 2:
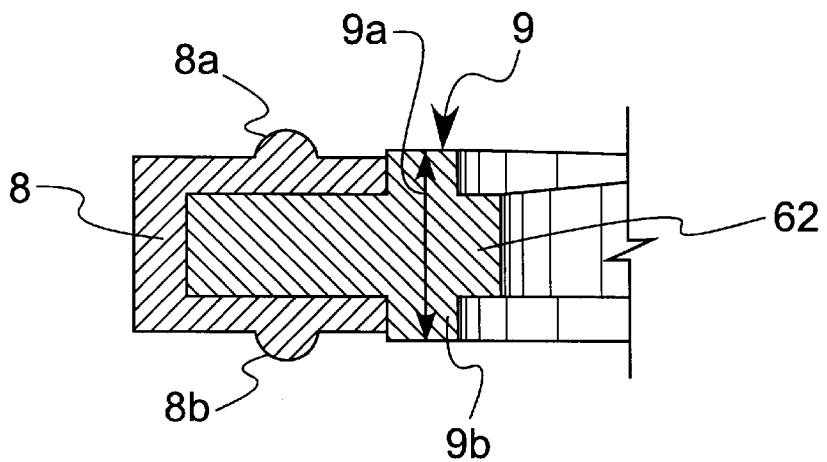
FIG. 2 represents an enlargement of the circled part A in FIG. 1 showing a section of the peripheral part of the second flange.

With reference to FIG. 2, the upper seal of the filter is provided thanks, on the one hand, to a peripheral seal 8 integrated with the periphery of the second flange 6 of the filter cartridge 3 and, on the other hand, to an internal 0-ring 14 on the inside edge of this same flange and co-operating with the cover 2.

The lower seal is itself provided by an internal seal 52 and an external seal 53 on the first flange 5 on either side of a groove 51 in it, said groove communicating with the emptying orifice 7 of the tank 1.

Figure 3:
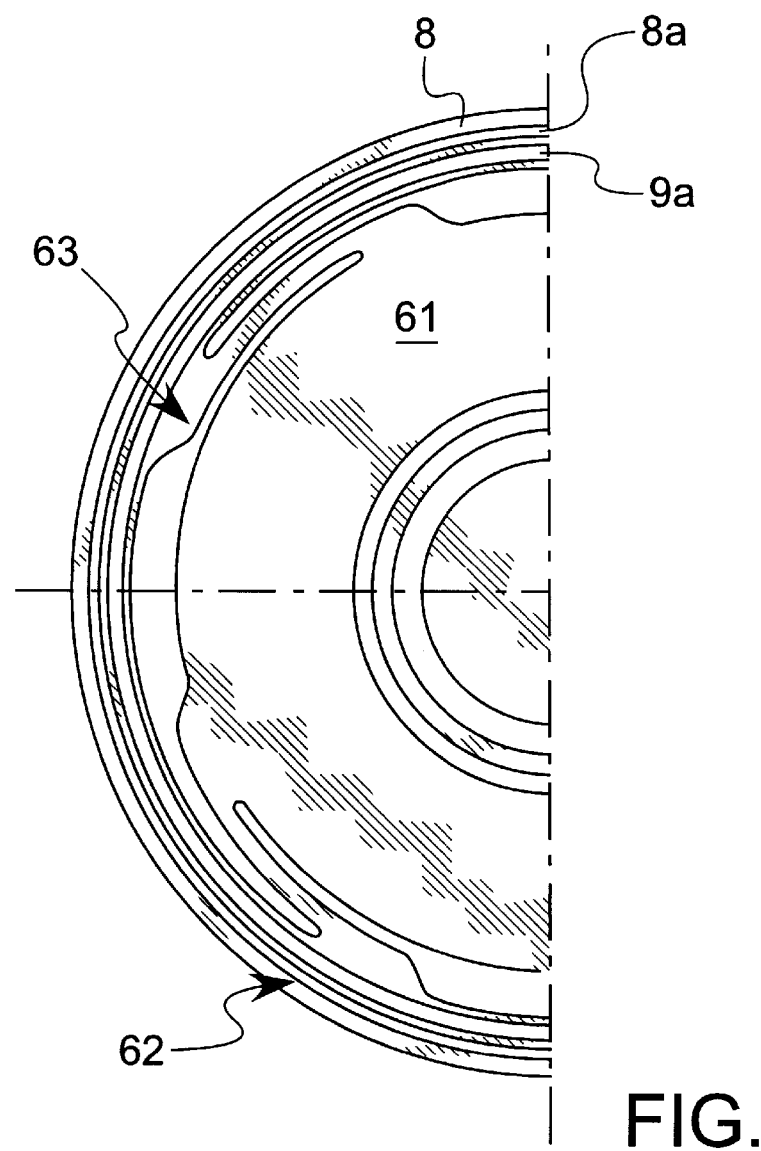
FIG. 3 represents a view from above of the second flange (half of it being shown, the other half being symmetrical)

As can be seen more clearly when referring to FIG. 3, the second flange 6 has three parts, namely a central part 61 directly fixed to the element of filtering material 4 (for example by bonding, keying or welding or any other suitable method), a peripheral part 62 that receives the integrated seal 8 and a flexible perforated part 63. As is made clear above, such a flexible flange allows one to improve the locking of the cartridge to the bottom of the filter, notably with the purpose of avoiding hyperstatic situations of the cartridge that can engender deterioration of the seals of the filter and in this case with the purpose of closing off an automatic emptying orifice 7 provided in the bottom of this tank.

Conforming to this invention and as one can see more clearly in FIG. 2 and in FIG. 3, the second flange 6 of the cartridge 3 is fitted with an element 9 forming a circular stop constituted by a first projecting element 9a on the upper face of the flange 6 and by a second projecting element 9b on the lower face of this flange. Such a stopping element allows one to control the tightening of the cover 2 on the tank 1 to a fixed and optimum value.

So as to improve the performance of the integrated seal 8, it is fitted with a ridge constituted by two bulges 8a, 8b projecting on either side of the seal 8, the height of which at rest is greater than that of the stops 9a, 9b in such a way as to control the squeezing of the seal between the cover and the tank.

Figure 4:
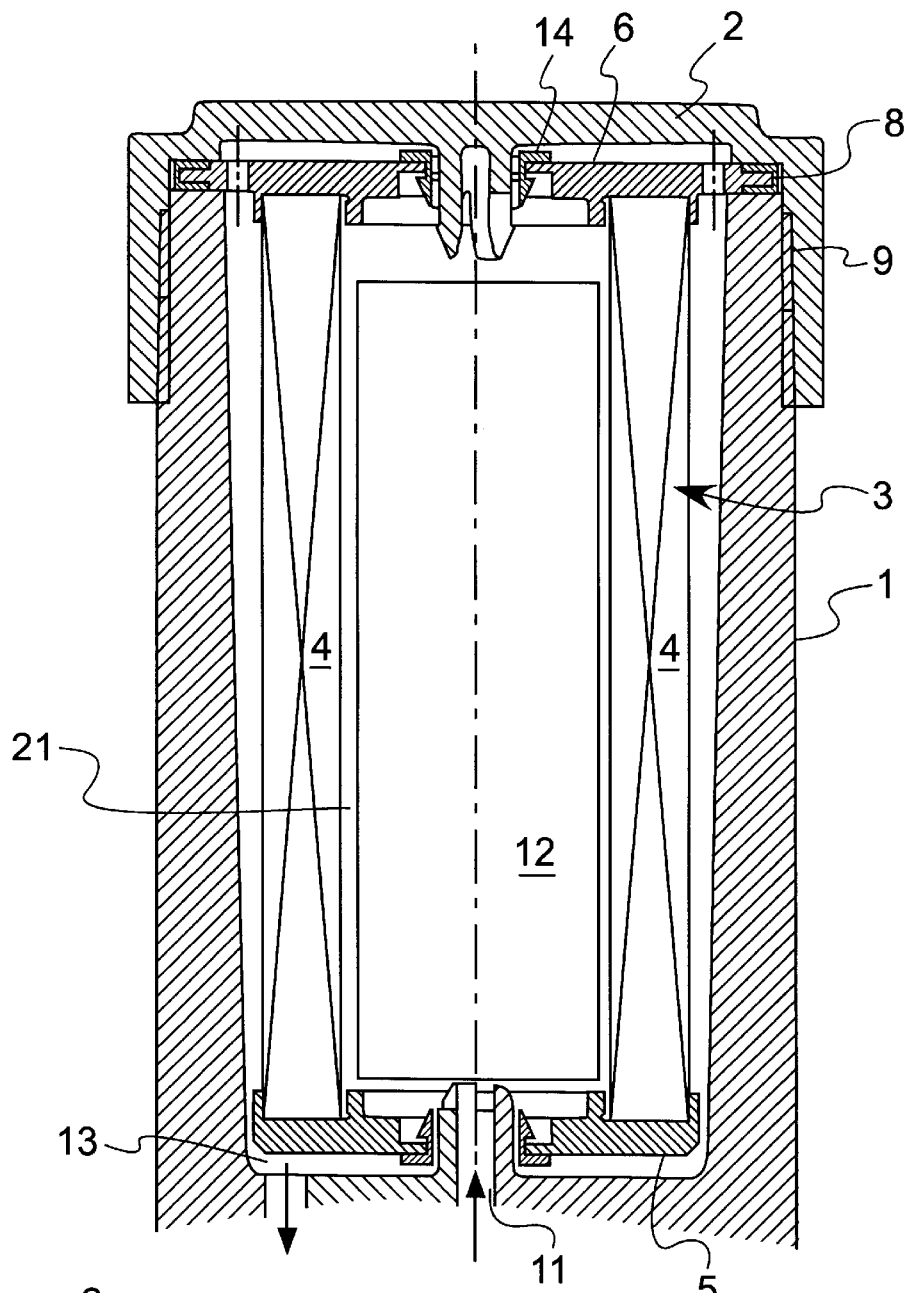
FIG. 4 represents a second embodiment of an filter for a liquid coolant fitted with a filter cartridge according to the invention.

Referring to FIG. 4, a second embodiment of a filter for a liquid coolant fitted with a filter cartridge according to the invention, is represented. The filter shown in this Figure only differs essentially from the filter represented with reference to FIGS. 1 to 3, in the direction of filtration used (shown by the arrows) which is the reverse of the direction of filtration of the first embodiment. According to this second embodiment, the liquid to be filtered is introduced under pressure into the filter through the inlet orifice 11 provided at the lower end of a cylinder 21 provided on the inside of the filtering material, passes through the upstream filtering compartment 12 defined by the longitudinal port of the cylinder, is filtered by forced passage within the filtering material 4 and finds itself in the downstream filtering compartment 13 defined by the internal wall of the tank 1 and the external wall of the cartridge 3. Conforming to the invention, the upper seal of the filter is provided thanks, on the one hand, to a peripheral seal 8 integrated with the periphery of the second flange 6 of the filter cartridge 3 and, on the other hand, to an internal seal 14 on the internal edge of this same flange and co-operating with the cover 2.

Figure 5:
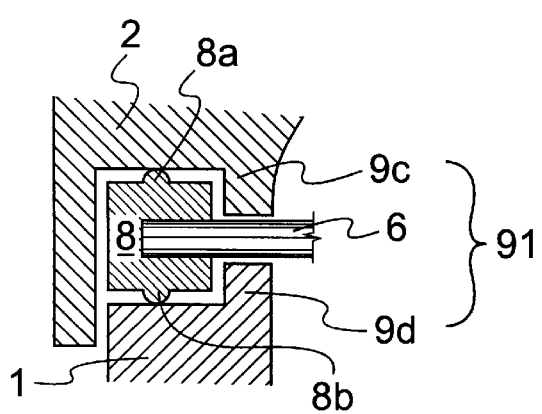
FIG. 5 represents another embodiment of the stopping element according to the invention.

Referring to FIG. 5, another embodiment of the stopping element of a filter according to the invention is described in which this stopping element 91 is constituted by one element 9c projecting from the closure element forming a cover 2, and by another element 9d projecting from the edge of the opening of the tank 1. The elements 9c and 9d permit the tightening of the cartridge to be controlled at its flange 6.

The embodiments of the invention described here do not have the purpose of reducing the scope of the invention. Numerous modifications could be made to it without departing from the context of the invention.

What is claimed is:

1. A filter assembly comprising:
   means forming an annular tank having an open end defining an opening,
   means for forming an annular replaceable filtering material insertable in said tank,
   a circular flange connected to one end of said filtering material means, said flange having an outer diameter sufficiently large to extend outward beyond said opening of the annular tank at the open end thereof,
   a peripheral seal element extending around the outer diameter of said flange,
   means for connecting said seal element to said flange so that said seal element is retained in place around the periphery of said flange when said filtering material and flange are out of said annular tank,
   a closure element releasably securable over the open end of said tank means for sandwiching said flange between said closure element and a portion of said tank extending radially outwardly beyond said opening, and said peripheral seal element having an axial thickness sufficiently great so that the peripheral seal element is compressed when said flange is sandwiched between said closure member and said portion of the annular tank, and
   stop means for positively limiting the compression of said peripheral seal element thereby maintaining an effective seal.

2. A filter assembly as claimed in claim 1 wherein said stop means is provided on said flange.

3. A filter assembly as claimed claim 1 wherein said stop means comprises at least one element projecting from said closure element forming means to abut said flange.

4. A filter assembly as claimed in claim 1 wherein said stop means comprises at least one element projecting from said tank forming means to abut said closure element.

5. A filter assembly as claimed in claim 1 wherein said flange comprises a peripheral part, a central part fixed to said filtering material means and a flexible part linking said central part to said peripheral part.

6. A filter assembly as claimed in claim 1 wherein said seal element is annular and has a radially inward facing recess, the periphery of said flange extending into said recess, thereby retaining said seal element in place.

7. A filter assembly as claimed in claim 6 wherein said stop means comprises at least one axially projecting rib on said flange.

8. A filter assembly as claimed in claim 7 wherein said stop means comprises a pair of continuous circumferentially extending ribs on said flange.

9. A filter assembly as claimed in claim 8, wherein a radially outer periphery of said circumferentially extending ribs abut an inner diameter of said annular seal element.

* * * * *